United States Patent
Suyama et al.

(10) Patent No.: US 9,148,018 B2
(45) Date of Patent: Sep. 29, 2015

(54) POWER SUPPLY DEVICE, POWER STORAGE DEVICE, AND POWER CONTROL DEVICE

(75) Inventors: Atsushi Suyama, Moriguchi (JP); Atsushi Shimizu, Moriguchi (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 352 days.

(21) Appl. No.: 13/581,736

(22) PCT Filed: Mar. 23, 2011

(86) PCT No.: PCT/JP2011/056905
§ 371 (c)(1),
(2), (4) Date: Aug. 29, 2012

(87) PCT Pub. No.: WO2011/118607
PCT Pub. Date: Sep. 29, 2011

(65) Prior Publication Data
US 2012/0319642 A1 Dec. 20, 2012

(30) Foreign Application Priority Data
Mar. 24, 2010 (JP) .................................. 2010-067316

(51) Int. Cl.
*H02J 7/00* (2006.01)
*H02J 3/32* (2006.01)

(52) U.S. Cl.
CPC ................. *H02J 3/32* (2013.01); *H02J 7/0031* (2013.01); *H02J 7/0073* (2013.01); *H02J 2007/0067* (2013.01); *Y02E 40/70* (2013.01); *Y02E 40/72* (2013.01); *Y02E 40/74* (2013.01); *Y02E 40/76* (2013.01); *Y02E 60/12* (2013.01)

(58) Field of Classification Search
CPC ......... Y02E 60/12; Y02E 90/14; Y02E 40/70; Y02E 40/72; Y02E 40/74; Y02E 40/76; H02J 7/0073; H02J 7/0031; H02J 2007/0067
USPC .................. 320/107, 109, 127, 132–137, 155
See application file for complete search history.

(56) References Cited

U.S. PATENT DOCUMENTS

| 8,836,281 | B2 * | 9/2014 | Ambrosio et al. | 320/109 |
| 2003/0171851 | A1 * | 9/2003 | Brickfield et al. | 700/286 |
| 2005/0043862 | A1 * | 2/2005 | Brickfield et al. | 700/295 |
| 2006/0085363 | A1 * | 4/2006 | Cheng et al. | 705/400 |
| 2008/0043862 | A1 * | 2/2008 | Yajima | 375/260 |

(Continued)

FOREIGN PATENT DOCUMENTS

| JP | 2002-245126 A | 8/2002 |
| JP | 2005-143218 A | 6/2005 |

(Continued)

OTHER PUBLICATIONS

International Search Report mailed Jun. 28, 2011 issued in corresponding International Application No. PCT/JP2011/056905.

(Continued)

*Primary Examiner* — Stacy Whitmore
(74) *Attorney, Agent, or Firm* — McDermott Will & Emery LLP (57) ABSTRACT

Disclosed is a power supply device which acquires data of the amount of environmental load material emitted from a power supply, and controls operations on the basis of the data.

23 Claims, 6 Drawing Sheets

(56) References Cited

U.S. PATENT DOCUMENTS

| | | | |
|---|---|---|---|
| 2008/0052145 A1* | 2/2008 | Kaplan et al. | 705/8 |
| 2008/0177423 A1* | 7/2008 | Brickfield et al. | 700/291 |
| 2008/0211230 A1* | 9/2008 | Gurin | 290/2 |
| 2008/0228628 A1* | 9/2008 | Gotthelf et al. | 705/37 |
| 2008/0306801 A1* | 12/2008 | Musier et al. | 705/8 |
| 2009/0088991 A1* | 4/2009 | Brzezowski et al. | 702/62 |
| 2009/0096416 A1* | 4/2009 | Tonegawa et al. | 320/109 |
| 2009/0192655 A1* | 7/2009 | Ichikawa et al. | 700/291 |
| 2009/0287520 A1* | 11/2009 | Zimmerman | 705/7 |
| 2009/0319090 A1* | 12/2009 | Dillon et al. | 700/291 |
| 2010/0114800 A1* | 5/2010 | Yasuda et al. | 705/412 |
| 2010/0138363 A1* | 6/2010 | Batterberry et al. | 705/412 |
| 2010/0145884 A1* | 6/2010 | Paik | 705/412 |
| 2010/0222935 A1* | 9/2010 | Forbes et al. | 700/291 |
| 2010/0283432 A1* | 11/2010 | Ellwanger et al. | 320/155 |
| 2011/0047102 A1* | 2/2011 | Grider et al. | 705/412 |
| 2011/0109266 A1* | 5/2011 | Rossi | 320/109 |
| 2012/0053848 A1* | 3/2012 | Doi et al. | 702/24 |
| 2012/0204044 A1* | 8/2012 | Lee et al. | 713/320 |
| 2012/0310793 A1* | 12/2012 | Cheng et al. | 705/28 |
| 2012/0319642 A1* | 12/2012 | Suyama et al. | 320/101 |
| 2013/0184888 A1* | 7/2013 | Forbes et al. | 700/291 |
| 2013/0249289 A1* | 9/2013 | Patel et al. | 307/26 |

FOREIGN PATENT DOCUMENTS

| | | |
|---|---|---|
| JP | 2005180755 A * | 7/2005 |
| JP | 2007-185083 A | 7/2007 |
| JP | 2007-295680 A | 11/2007 |
| JP | 2008-054439 A | 3/2008 |
| JP | 2009-232670 A | 10/2009 |

OTHER PUBLICATIONS

Japanese Office Action issued in Japanese Application No. 2012-507024, dated Dec. 16, 2014.

* cited by examiner

| PERIOD OF TIME IN WHICH EMISSION AMOUNT OF CARBON DIOXIDE IS LOW ||
|---|---|
| RANKING | PERIOD OF TIME |
| 1 | 4:00−5:00 |
| 2 | 3:00−4:00 |
| 3 | 2:00−3:00 |
| ⋮ | ⋮ |
| 2 2 | 15:00−16:00 |
| 2 3 | 14:00−15:00 |
| 2 4 | 13:00−14:00 |

POWER SUPPLY DEVICE, POWER STORAGE DEVICE, AND POWER CONTROL DEVICE

RELATED APPLICATIONS

This application is the U.S. National Phase under 35 U.S.C. §371 of International Application No. PCT/JP2011/056905, filed on Mar. 23, 2011, which in turn claims the benefit of Japanese Application No. 2010-067316, filed on Mar. 24, 2010, the disclosures of which Applications are incorporated by reference herein.

TECHNICAL FIELD

The present invention relates to a power supply device that power.

BACKGROUND ART

In recent years, power supply systems that control supply of power to be consumed in households, stores, and so on have come into widespread use. In particular, a power supply system of a type that performs various kinds of control in order to achieve a predetermined purpose such as cost reduction or the like is becoming pervasive.

For example, Patent Document 1 proposes a power supply system that sets an operational schedule of power consuming equipment and controls the amount of power to be charged in a storage battery so that redundancy of power produced by solar photovoltaics is eliminated, thereby achieving energy saving and cost reduction.

Furthermore, for example, Patent Document 2 proposes a power supply system that sequentially simulates purchasing and selling costs of power produced by solar photovoltaics, costs involved in charging and discharging a storage battery, and so on and based thereon, controls the amount of power to be charged in/discharged from the storage battery so that a total cost is reduced.

LIST OF CITATIONS

Patent Literature

Patent Document 1: JP-A-2007-295680
Patent Document 2: JP-A-2005-143218

SUMMARY OF THE INVENTION

Technical Problem

By using the power supply systems proposed in Patent Document 1 and Patent Document 2, respectively, energy saving and cost reduction can be achieved. In a case, however, where the above-described power supply systems are each applied to, for example, a store or the like (for example, a convenience store) in which daytime power consumption is high, even a combined total amount of power produced by solar photovoltaics and power supplied by discharging the storage battery may not be sufficient enough to provide a full amount of power that is to be consumed in the daytime. In such a case, the store or the like consumes power purchased from a power company, and the power company performs power generation based on how power is thus consumed by the store or the like. As a result, the power company is forced to generate an enormous amount of power, for example, in the daytime, which is problematic in that, even if energy saving and so on are achieved, there cannot be achieved a reduction in the company's emission amount of a substance that places a load on the environment (hereinafter, referred to as an "environmental load substance") such as, for example, $CO_2$, $NO_x$, $SO_x$, or the like. Carbon dioxide, in particular, is regarded as one of the factors responsible for global warming, and there has been a worldwide demand for a reduction in the emission amount thereof.

In the power supply system proposed in Patent Document 1, since the operational schedule of the equipment is restricted, the equipment is significantly deteriorated in terms of convenience to possibly cause interference with a user's life. Furthermore, in the power supply system proposed in Patent Document 2, since a simulation needs to be performed frequently, a highly advanced arithmetic processor and power to be used for arithmetic processing are required.

With the foregoing in mind, it is an object of the present invention to provide a power supply device, a power storage device, and a power control device that achieve an effective reduction in the emission amount of an environmental load substance.

Solution to the Problem

In order to achieve the above-described object, a power supply device according to the present invention acquires data on the emission amount of an environmental load substance emitted by a power source and based on said data, performs operational control.

Furthermore, the power supply device configured as above may further include a database in which data on the emission amount of the environmental load substance emitted by the power source is recorded. Furthermore, in the power supply device configured as above, said data may be acquired from an external database in which data on the emission amount of the environmental load substance emitted by the power source is recorded.

Furthermore, the power supply device configured as above may further include: a power storage portion in which power supplied from the power source is charged and that supplies power by being discharged; and a charging and discharging control portion that acquires data on the emission amount of the environmental load substance emitted by the power source and based on said data, controls charging and discharging of the power storage portion.

According to this configuration, even when power supplied from the power supply device is consumed as intended by a user, by controlling charging and discharging of the power storage portion, it is possible to reduce the emission amount of the environmental load substance while securing the supply of a user's desired amount of power. This makes it possible to reduce the emission amount of the environmental load substance while allowing a user to lead a usual life.

In an embodiment described later, as the charging and discharging control portion, a carbon dioxide emission amount analysis portion, a required power amount calculation portion, a charging and discharging plan formulation portion, and a power storage portion control portion are described exemplarily.

Furthermore, the power supply device configured as above may have a configuration in which the charging and discharging control portion preferentially charges the power storage portion when the emission amount of the environmental load substance emitted by the power source is low and preferentially discharges the power storage portion when the emission amount of the environmental load substance emitted by the power source is high.

According to this configuration, the emission amount of the environmental load substance emitted by the power source can be reduced efficiently.

Furthermore, in the power supply device configured as above, the emission amount of the environmental load substance may refer to the emission amount of carbon dioxide.

Furthermore, the power supply device configured as above may have the following configuration. That is, there is further provided a load prediction portion that predicts an amount of power that is to be consumed by a load portion that consumes power supplied thereto. The power supply device can supply the load portion with power supplied from the power source and with power supplied by discharging the power storage portion, and based on the amount of power predicted by the load prediction portion, the charging and discharging control portion controls discharging of the power storage portion.

According to this configuration, an amount of power that is to be consumed by the load portion is predicted, and based on the amount of power thus predicted, discharging of the power storage portion is controlled. This allows power charged in the power storage portion to be consumed by the load portion automatically without being wasted.

Furthermore, the power supply device configured as above may have the following configuration. That is, there is further provided a power generation prediction portion that predicts an amount of power that is to be supplied from a different power source than the power source. The power supply device can supply the load portion with power supplied from the different power source, and the charging and discharging control portion discharges the power storage portion when the amount of power predicted by the load prediction portion is larger than the amount of power predicted by the power generation prediction portion.

According to this configuration, an amount of power that is to be generated by the different power source and an amount of power that is to be consumed by the load portion are predicted, and based on the amounts of power thus predicted, discharging of the power storage portion is controlled. This allows power charged in the power storage portion to be consumed by the load portion automatically without being wasted.

Furthermore, the power supply device configured as above may have a configuration in which when data on the emission amount of the environmental load substance emitted by the power source is acquired, data corresponding to predicted weather is acquired.

Furthermore, the power supply device configured as above may have a configuration in which when data on the emission amount of the environmental load substance emitted by the power source is acquired, data corresponding to timing for performing operational control is acquired.

This configuration enables an accurate grasp of an emission amount of the environmental load substance emitted by the power source.

Furthermore, the power supply device configured as above may have the following configuration. That is, there is further provided a power generation history recording portion that records information on the amount of power generated by the different power source. The power generation prediction portion acquires, from the power generation history recording portion, information corresponding to predicted weather and thereby predicts an amount of power that is to be supplied from the different power source.

Furthermore, the power supply device configured as above may have the following configuration. That is, there is further provided a power generation history recording portion that records information on the amount of power generated by the different power source. The power generation prediction portion acquires, from the power generation history recording portion, information corresponding to timing at which the charging and discharging control portion controls the power storage portion and thereby predicts an amount of power that is to be supplied from the different power source.

This configuration enables an accurate prediction of an amount of power that is to be supplied from the different power source.

Furthermore, the power supply device configured as above may have a configuration in which the different power source produces power by solar photovoltaics.

Furthermore, the power supply device configured as above may have the following configuration. That is, there is further provided a load history recording portion that records information on the amount of power consumed by the load portion. The load prediction portion acquires, from the load history recording portion, information corresponding to predicted weather and thereby predicts an amount of power that is to be supplied to the load portion.

Furthermore, the power supply device configured as above may have the following configuration. That is, there is further provided a load history recording portion that records information on the amount of power consumed by the load portion. The load prediction portion acquires, from the load history recording portion, information corresponding to timing at which the charging and discharging control portion controls the power storage portion and thereby predicts an amount of power that is to be supplied to the load portion.

This configuration enables an accurate prediction of an amount of power that is to be consumed by the load portion.

Furthermore, in order to achieve the above-described object, a power storage device according to the present invention acquires data on the emission amount of an environmental load substance emitted by a power source and based on said data, controls charging or discharging.

Furthermore, in order to achieve the above-described object, a power control device according to the present invention acquires data showing a relationship between a time and an emission amount of an environmental load substance, which is provided from a power source, and based on said data, implements a power consumption plan.

Advantageous Effects of the Invention

The configuration according to the present invention operates based on the emission amount of an environmental load substance emitted by a power source and thus can easily achieve a reduction in the emission amount of the environmental load substance emitted by the power source. Furthermore, compared with the emission amount of an environmental load substance emitted by households, stores, and so on, the emission amount of the environmental load substance emitted by a power source (for example, a power company) accounts for an extremely large proportion of a total emission amount thereof. Thus, reducing the emission amount of the environmental load substance emitted by the power source enables an effective reduction in the total emission amount of the environmental load substance.

DESCRIPTION OF EMBODIMENTS

The following describes, with reference to the appended drawings, a power supply system (a power supply device, a power storage device, and a power control device according to the present invention) as one embodiment of the present invention. First, with reference to the drawings, a description is made of one example of a configuration of the power supply system as one embodiment of the present invention.

Figure 1:
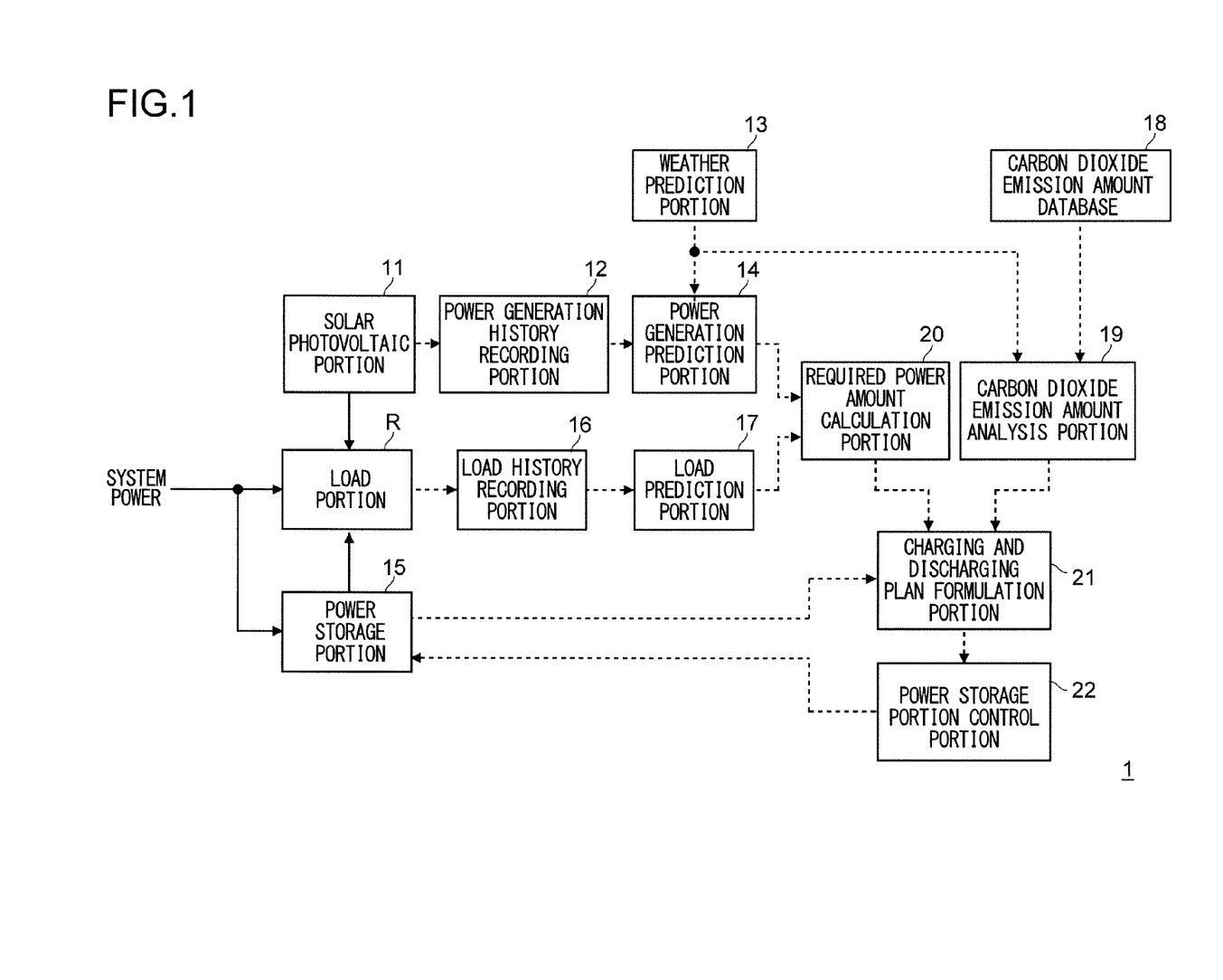
[FIG. 1] A block diagram showing a configuration example of a power supply system as one embodiment of the present invention.

FIG. 1 is a block diagram showing a configuration example of the power supply system as one embodiment of the present invention. In the figure, a solid line arrow and a dashed line arrow, each making a connection between blocks, indicate power exchange and information exchange, respectively.

A power supply system 1 shown in FIG. 1 includes: a solar photovoltaic portion 11 that produces power by solar photovoltaics; a power generation history recording portion 12 that records, in chronological order, information on the amount of power generated by the solar photovoltaic portion 11; a weather prediction portion 13 that predicts weather (this term may encompass, in addition to categories such as fine weather, cloudy weather, rainy weather, and the like, a temperature, a humidity, a wind velocity, and so on; the same applies hereinafter); a power generation prediction portion 14 that, based on a result of weather prediction by the weather prediction portion 13 and a piece of information acquired from the power generation history recording portion 12, predicts an amount of power that is to be generated by the solar photovoltaic portion 11; a power storage portion 15 that is charged with power (system power) purchased from a power company and supplies power by being discharged; a load history recording portion 16 that records, in chronological order, information on the amount of power consumed by a load portion R that operates by consuming power supplied from the solar photovoltaic portion 11 and from the power storage portion 15 and system power; a load prediction portion 17 that, based on a piece of information acquired from the load history recording portion 16, predicts an amount of power that is to be consumed by the load portion R; a carbon dioxide emission amount database 18 in which data on the emission amount of carbon dioxide emitted by the power company has been recorded; a carbon dioxide emission amount analysis portion 19 that, based on a result of weather prediction by the weather prediction portion 13 and a piece of data acquired from the carbon dioxide emission amount database, analyzes an emission amount of carbon dioxide emitted by the power company; a required power amount calculation portion 20 that, based on an amount of power predicted by the power generation prediction portion 14 and an amount of power predicted by the load prediction portion, calculates an amount of system power that should be purchased; a charging and discharging plan formulation portion 21 that, based on a result of the analysis by the carbon dioxide emission amount analysis portion 19, an amount of system power calculated by the required power amount calculation portion 20, and an amount of power charged in the power storage portion 15, formulates a charging plan and a discharging plan with respect to the power storage portion 15 (hereinafter, also referred to collectively as a charging and discharging plan); and a power storage portion control portion 22 that controls charging and discharging of the power storage portion 15 in accordance with a charging and discharging plan formulated by the charging and discharging plan formulation portion 21.

The load portion R is made up of various types of power consuming equipment such as an air conditioner, a refrigerator, and so on. The load portion R operates by being supplied with, in addition to system power, power produced by power generation by the solar photovoltaic portion 11 and power discharged from the power storage portion 15.

The power storage portion 15, which is constituted by, for example, a large capacity battery, is charged with system power and supplies power to the load portion R by being discharged. Furthermore, charging and discharging of the power storage portion 15 are controlled by the power storage portion control portion 22. The power storage portion 15 may be configured such that it can be charged not only with system power but also with power produced by the solar photovoltaic portion 11.

The weather prediction portion 13 acquires information on future weather (a weather forecast) by, for example, utilizing a network line such as the Internet or the like and thereby predicts (acquires) the future weather. Alternatively, the weather prediction portion 13 may collect information required for a prediction by weather observation or the like and based thereon, actually predict future weather.

The power generation history recording portion 12 records histories of the amount of power generated by the solar photovoltaic portion 11 per predetermined period of time (for example, per hour). An amount of power generated by the solar photovoltaic portion 11 may be recorded in association with weather and a time of year (a season, a date, or the like). Moreover, information on the weather at the time of power generation may be acquired by utilizing a network line such as the Internet or the like, or alternatively, information on the weather at the time of power generation may be acquired from the weather prediction portion 13.

The load history recording portion 16 records histories of the amount of power consumed by the load portion R per predetermined period of time (for example, per hour). Similarly to the power generation history recording portion 12, in the load history recording portion 16, an amount of power consumed by the load portion R may be recorded in association with weather and a time of year. Moreover, information on the weather at the time of power consumption may be acquired by utilizing a network line such as the Internet or the like, or alternatively, information on the weather at the time of power consumption may be acquired from the weather prediction portion 13.

In the carbon dioxide emission amount database 18, data on the emission amount of carbon dioxide emitted as a consequence of purchasing system power is recorded. That is, data on the emission amount of carbon dioxide emitted when the power company performs power generation is recorded therein. Furthermore, said data is chronological data, and by referring to said data, the emission amount of carbon dioxide (for example, the emission amount thereof per unit amount of power) emitted per predetermined period of time (for example, per hour) is grasped.

The carbon dioxide emission amount database 18 may be configured to be provided in each power supply system 1 or may be configured such that it can communicate with one or a plurality of power supply systems 1 via a network line such as the Internet or the like. Furthermore, the data recorded in the carbon dioxide emission amount database 18 may be updated frequently depending on, for example, a status of power generation by the power company.

Furthermore, the power supply system 1 may be configured to further include another power source such as a fuel battery. Furthermore, there may be adopted a configuration in which not only system power but also power produced by the solar photovoltaic portion 11 can be charged in the power storage portion 15.

The power supply system 1 as one embodiment of the present invention controls charging and discharging of the power storage portion 15 and thereby reduces the emission amount of carbon dioxide emitted by the power company. Furthermore, the power storage portion 15 is charged and discharged in accordance with a charging and discharging plan formulated by the charging and discharging plan formulation portion 21. With reference to the appended drawings, the following describes a method for formulating a charging and discharging plan. In the following, for the sake of specific explanation, it is assumed that the charging and discharging plan formulation portion 21 formulates a charging and discharging plan of charging and discharging to be performed on the next day.

Figure 2:
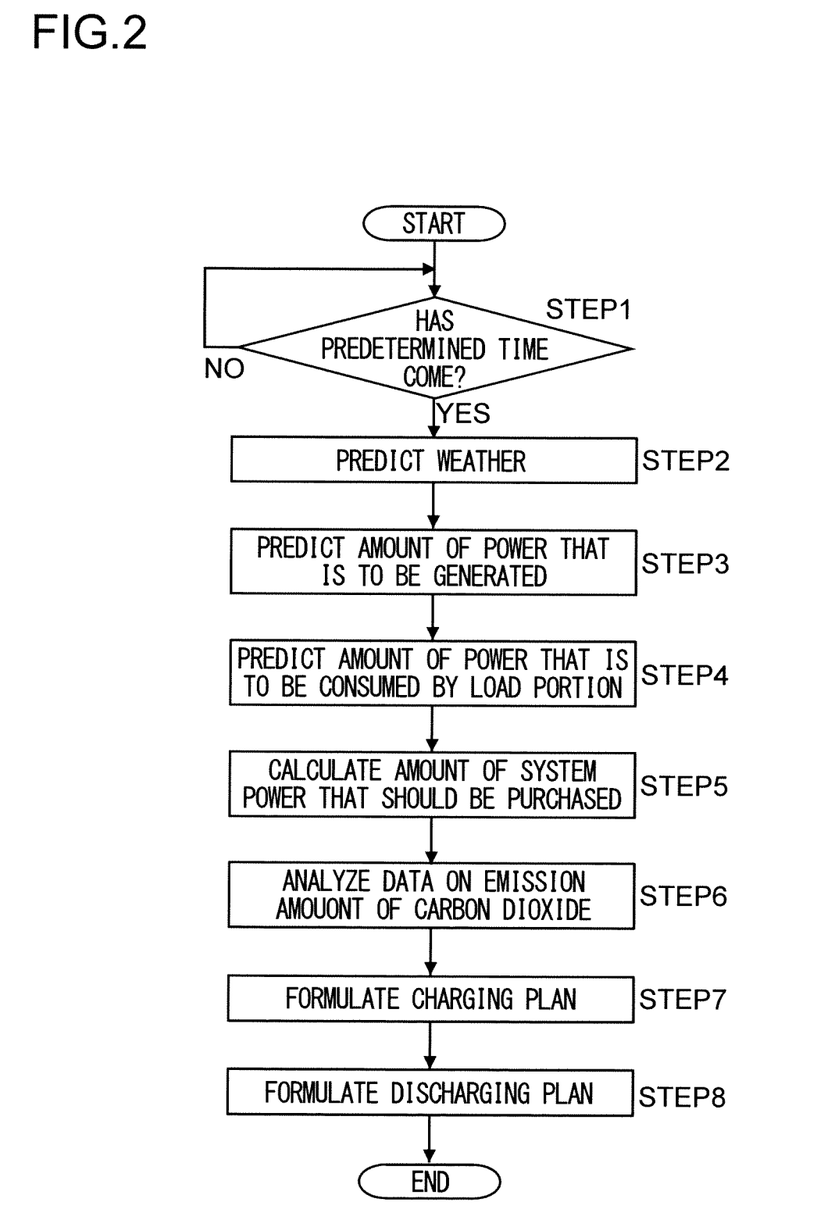
[FIG. 2] A flow chart showing an example of an operation of formulating a charging and discharging plan with respect to a power storage portion.

FIG. 2 is a flow chart showing an example of an operation of formulating a charging and discharging plan with respect to the power storage portion. As shown in FIG. 2, the power supply system 1 checks whether or not a predetermined time (for example, 23:00) has come (STEP 1). For example, a control portion (not shown) that performs control with respect to various parts in the power supply system checks the time. Until the predetermined time comes (STEP 1, NO), the formulation of the charging and discharging plan is not started.

On the other hand, when the predetermined time has come (STEP 1, YES), the weather prediction portion 13 predicts the weather of the next day (STEP 2). Furthermore, based on a result of the weather prediction by the weather prediction portion 13 and the histories recorded in the power generation history recording portion 12, the power generation prediction portion 14 predicts an amount of power that is to be generated by the solar photovoltaic portion 11 on the next day (STEP 3). In particular, an amount of power that is to be generated per predetermined period of time (for example, per hour) is predicted. At this time, it is preferable to consult, in particular, a history of a day at a similar time of year to the next day, the weather of which is similar to weather as the result of the weather prediction (specifically, for example, a fine day in September), since such consultation enables an accurate prediction of an amount of power that is to be generated by the solar photovoltaic portion 11.

Furthermore, based on the histories recorded in the load history recording portion 16, the load prediction portion 17 predicts an amount of power that is to be consumed by the load portion R on the next day (STEP 4). In particular, an amount of power that is to be consumed per predetermined period of time (for example, per hour) is predicted. Similarly to the power generation prediction portion 14, the load prediction portion 17 also may consult, in particular, a history of a day at a similar time of year to the next day, the weather of which is similar to weather as the result of the weather prediction (specifically, for example, a fine day in September). This configuration enables an accurate prediction of an amount of power that is to be consumed by the load portion R.

Figure 3:
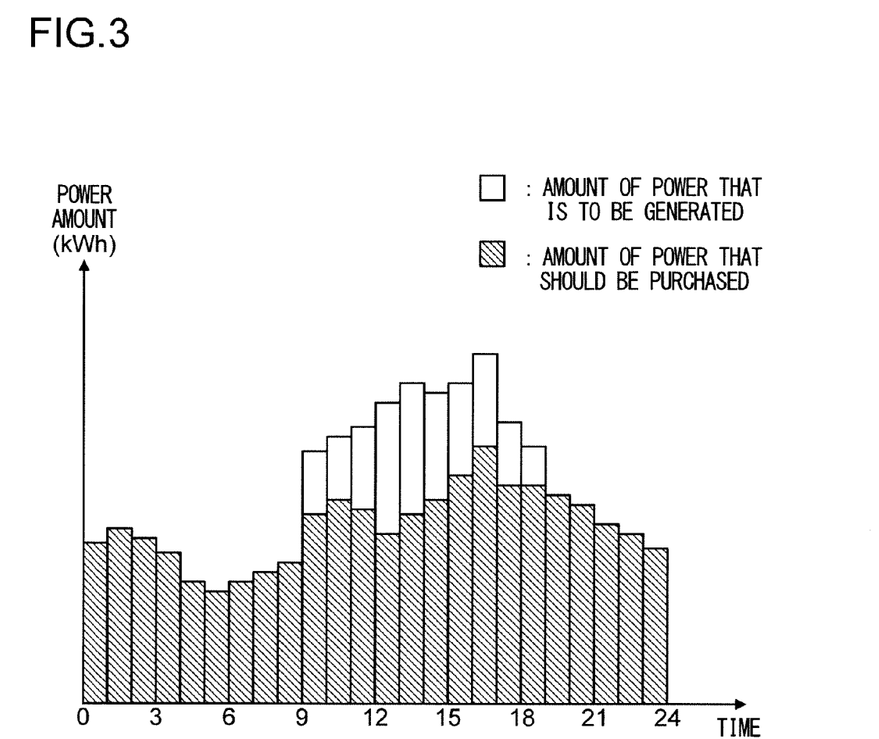
[FIG. 3] A graph showing one example of an amount of power predicted to be generated by a solar photovoltaic portion and an amount of system power that should be purchased.

Furthermore, based on the amount of power that is to be generated by the solar photovoltaic portion 11 as predicted by the power generation prediction portion 14 and the amount of power that is to be consumed by the load portion R as predicted by the load prediction portion 17, the required power amount calculation portion 20 calculates an amount of system power that should be purchased (STEP 5). With reference to FIG. 3, a description is made of one example of a method for calculating system power that should be purchased. FIG. 3 is a graph showing one example of an amount of power predicted to be generated by the solar photovoltaic portion and an amount of system power that should be purchased. In FIG. 3, with respect to each period of time of one hour, an amount of power predicted to be generated by the solar photovoltaic portion 11 and an amount of system power that should be purchased are represented by the height of each bar in a bar graph.

In FIG. 3, an amount of power that is to be generated by the solar photovoltaic portion 11 as predicted by the power generation prediction portion 14 is indicated by a hollow region, and an amount of system power that should be purchased is indicated by a slant-hatched region. Furthermore, an amount of power that is to be consumed by the load portion R as predicted by the load prediction portion 17 is indicated by each bar as a whole (a region obtained by combining the hollow region with the slant-hatched region). That is, an amount of power obtained by subtracting an amount of power that is to be generated by the solar photovoltaic portion 11 as predicted by the power generation prediction portion 14 from an amount of power that is to be consumed by the load portion R as predicted by the load prediction portion 17 is defined as an amount of system power that should be purchased.

Figure 4:
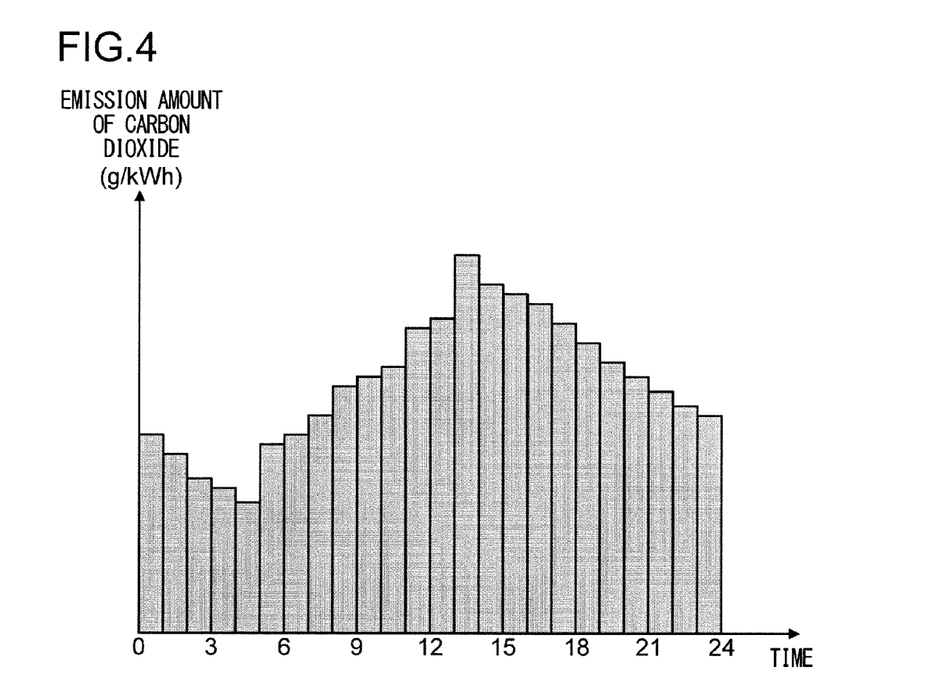
[FIG. 4] A graph showing one example of data on the emission amount of carbon dioxide.
Figure 5:
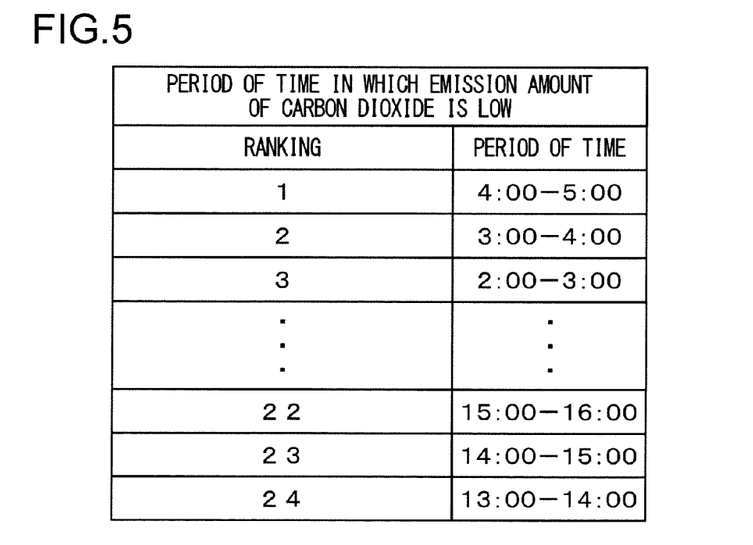
[FIG. 5] A table showing one example of a result of analyzing the data on the emission amount of carbon dioxide.

Next, the carbon dioxide emission amount analysis portion 19 analyzes a piece of data acquired from the carbon dioxide emission amount database 18 (STEP 6). With reference to FIGS. 4 and 5, a description is made of one example of an analysis method. FIG. 4 is a graph showing one example of data on the emission amount of carbon dioxide, and FIG. 5 is a table showing one example of a result of analyzing the data on the emission amount of carbon dioxide. In FIG. 4, with respect to each period of time of one hour, an emission amount of carbon dioxide per unit amount (1 kWh) of system power purchased is represented by the height of each bar in a bar graph.

The carbon dioxide emission amount analysis portion 19 acquires a piece of data shown in FIG. 4 from the carbon dioxide emission amount database 18. At this time, it is preferable that, in acquiring the piece of data, the carbon dioxide emission amount analysis portion 19 consult, in particular, a piece of data of a day at a similar time of year to the next day, the weather of which is similar to weather as a result of the weather prediction (specifically, for example, a fine day in September), since such consultation enables an accurate grasp of an emission amount of carbon dioxide.

Based on the piece of data shown in FIG. 4, the carbon dioxide emission amount analysis portion 19 obtains an analysis result shown in FIG. 5. Specifically, the periods of time are sorted in ascending order of the emission amount of carbon dioxide per unit amount of power (in ascending order of the bar height in the bar graph shown in FIG. 4). In the example shown in FIGS. 4 and 5, the emission amount of carbon dioxide increases in the order of the period of time of 4:00 to 5:00, the period of time of 3:00 to 4:00, and the period of time of 2:00 to 3:00. Conversely, the emission amount of carbon dioxide decreases in the order of the period of time of 13:00 to 14:00, the period of time of 14:00 to 15:00, and the period of time of 15:00 to 16:00.

Then, based on a result of the calculation by the required power amount calculation portion 20 (for example, in FIG. 3) and a result of the analysis by the carbon dioxide emission amount analysis portion 19 (for example, in FIG. 5), the charging and discharging plan formulation portion 21 formulates a charging plan (STEP 7) and a discharging plan (STEP 8) and ends the formulation of a charging and discharging plan.

Figure 6:
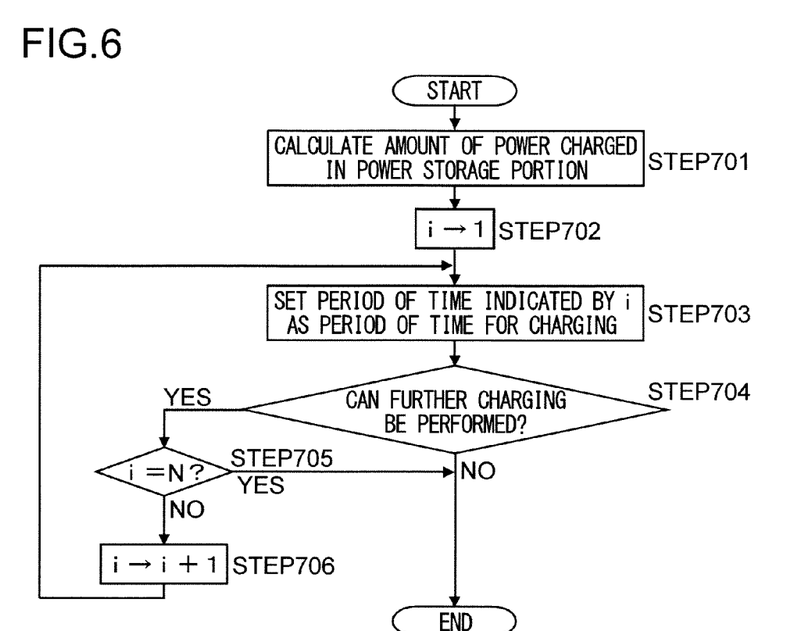
[FIG. 6] A flow chart showing one example of a method for formulating a charging plan.

With reference to FIG. 6, a description is made of a specific example of a method for formulating a charging plan. FIG. 6 is a flow chart showing one example of the method for formulating a charging plan. As shown in FIG. 6, the charging and discharging plan formulation portion 21 first calculates an amount of power charged (remaining) in the power storage portion 15 (STEP 701). In this case, it is preferable to calculate, instead of calculating an amount of power at the present time (for example, 23:00), an amount of power at a time (for example, 0:00 of the next day) at which a charging and discharging plan for the present day (the day before the next day) is ended and a charging and discharging plan for the next day is started. Said amount of power can be calculated based on, for example, the amount of power charged in the power storage portion 15 at the present time and the charging and discharging plan for the present day.

Next, the charging and discharging plan formulation portion 21 sets a variable i to 1 (STEP 702). The variable i indicates a place in the ranking of the periods of time in ascending order of the emission amount of carbon dioxide shown in FIG. 5. That is, a "period of time indicated by i=1" corresponds to the period of time of "4:00 to 5:00" ranked in the first place in FIG. 5. This period of time indicated by i is set as a period of time for charging the power storage portion 15 with system power (STEP 703).

Furthermore, the charging and discharging plan formulation portion 21 checks whether or not further charging can be performed (in other words, whether or not, if charged in this period of time indicated by the variable i, the power storage portion 15 is brought to a state of charge of 100% or of not less than a predetermined percentage) (STEP 704).

If further charging cannot be performed (STEP 704, NO), the formulation of a charging plan (setting of a period of time for charging) is ended. Furthermore, also in a case where, even if further charging can be performed (STEP 704, YES), the variable i has attained a maximum number of times of charging N (STEP 705, YES), the formulation of a charging plan is ended. The maximum number of times of charging N can be preset by, for example, a user or the like.

On the other hand, if further charging can be performed (STEP 704, YES), and the variable i has not yet attained the maximum number of times of charging N (STEP 705, NO), a number obtained by adding 1 to a present value of the variable i is set as a new variable i (STEP 706). Then, a return is made to STEP 703, where a period of time indicated by the new variable i is set as a period of time for charging the power storage portion 15 with system power. From this point forward, the above-described operations are performed repeatedly in a similar manner until no further charging can be performed (STEP 704, NO) or until the variable i attains the maximum number of times of charging N (STEP 705, YES).

Figure 7:
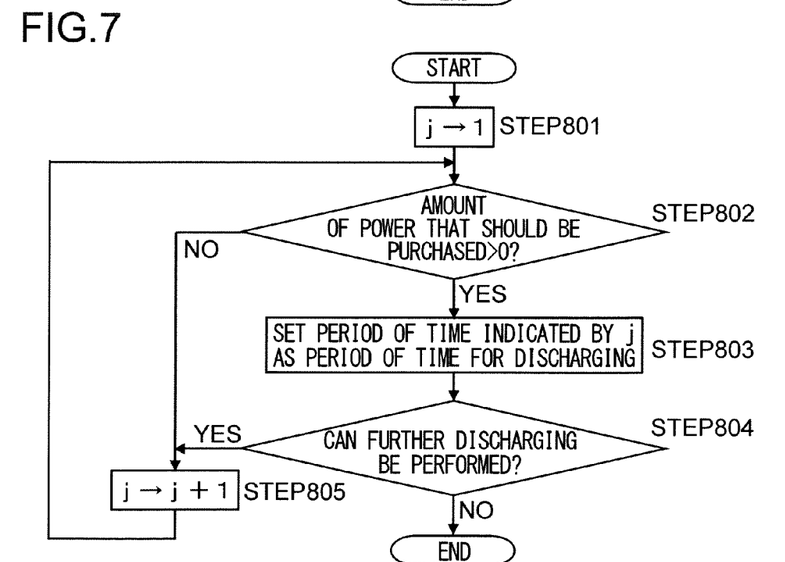
[FIG. 7] A flow chart showing one example of a method for formulating a discharging plan.

Furthermore, with reference to FIG. 7, a description is made of a specific example of a method for formulating a discharging plan. FIG. 7 is a flow chart showing one example of the method for formulating a discharging plan. As shown in FIG. 7, the charging and discharging plan formulation portion 21 sets a variable j to 1 (STEP 801). The variable j indicates a place in the ranking of the periods of time in an order inverse to the order shown in FIG. 5 (a place in the ranking of the periods of time in descending order of the emission amount of carbon dioxide, which can be construed also as being expressed by j=25−i). That is, a "period of time indicated by j=1" corresponds to the period of time of "13:00 to 14:00 ranked in the 24th place in FIG. 5.

Next, it is checked whether or not, in this period of time indicated by the variable j, an amount of system power that should be purchased (for example, a height of the slant-hatched region in FIG. 3) is larger than 0 (STEP 802).

Examples of a case where an amount of system power that should be purchased is not more than 0 (STEP 802, NO) include a case where an amount of power generated by the solar photovoltaic portion 11 is sufficient enough to provide a full amount of power that is to be consumed by the load portion R and a case where an amount of power that is to be consumed by the load portion R is 0. In such a case, a number obtained by adding 1 to a present value of the variable j is set as a new variable j (STEP 805). Then, a return is made to STEP 802, where it is checked whether or not, in a period of time indicated by the new variable j, an amount of system power that should be purchased is larger than 0 (STEP 802).

On the other hand, if, in the period of time indicated by j, an amount of system power that should be purchased is larger than 0 (STEP 802, YES), this period of time indicated by the variable j is set as a period of time for discharging the power storage portion 15 (STEP 803). Furthermore, the charging and discharging plan formulation portion 21 checks whether or not further discharging can be performed (in other words, whether or not, if discharged in this period of time indicated by j, the power storage portion 15 is brought to a state of charge of 0% or of not more than a predetermined percentage) (STEP 804).

If further discharging cannot be performed (STEP 804, NO), the formulation of a discharging plan (setting of a period of time for discharging) is ended. On the other hand, if further discharging can be performed (STEP 804, YES), a number obtained by adding 1 to a present value of the variable j is set as a new variable j (STEP 805). Then, a return is made to STEP 802, where it is checked whether or not, in a period of time indicated by the new variable j, an amount of system power that should be purchased is larger than 0. From this point forward, the above-described operations are performed repeatedly in a similar manner until no further discharging can be performed (STEP 804, NO).

Figure 8:
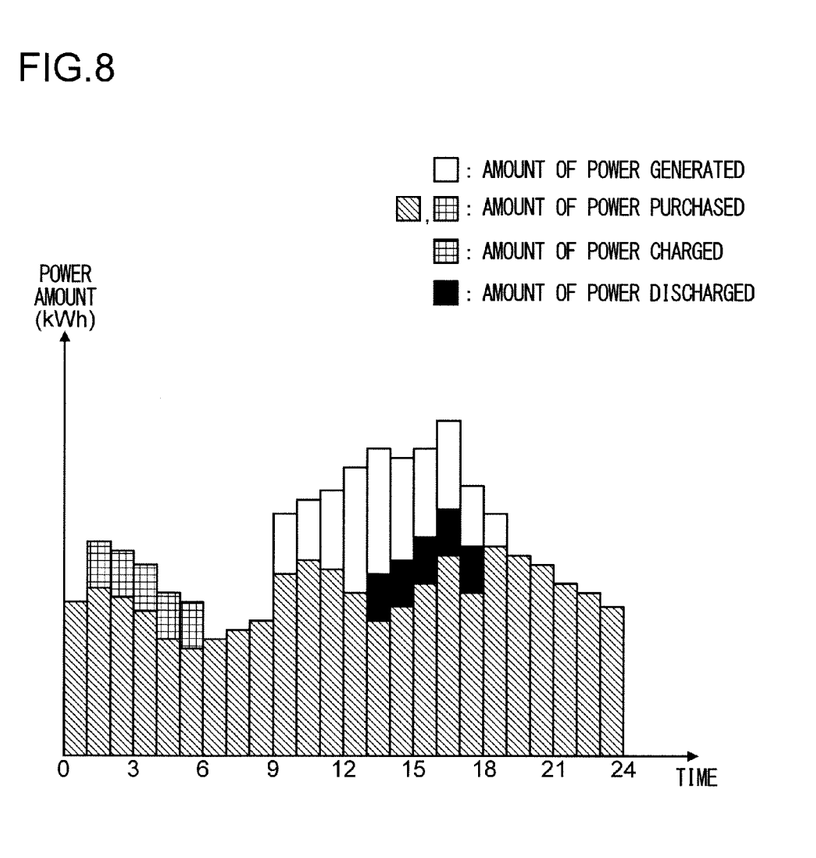
[FIG. 8] A graph showing an example of the operation of a power supply system.

With reference to the appended drawings, a description is made of one example of the operation of the power supply system in a case where the power storage portion 15 is operated in accordance with a charging and discharging plan formulated in the above-described manner. FIG. 8 is a graph showing an example of the operation of the power supply system. In FIG. 8, similarly to FIG. 3, with respect to each period of time of one hour, an amount of power generated by the solar photovoltaic portion 11, an amount of system power purchased, an amount of power charged in the power storage portion 15, and an amount of power discharged from the power storage portion 15 are represented by the height of each bar in a bar graph.

Furthermore, in FIG. 8, it is assumed that the same amount of power as predicted by the power generation prediction portion 14 is generated by the solar photovoltaic portion 11, and the same amount of power as predicted by the load prediction portion 17 is consumed by the load portion R (see FIG. 3). An actual amount of power generated by the solar photovoltaic portion 11 and an actual amount of power consumed by the load portion R may vary from predicted amounts thereof, respectively.

In FIG. 8, an amount of power generated by the solar photovoltaic portion 11 is indicated by a hollow region, and an amount of system power purchased is indicated by a slant-hatched region. Furthermore, an amount of system power purchased as power to be charged in the power storage portion 15 is indicated by a lattice-hatched region, and an amount of power supplied by discharging the power storage portion 15 is indicated by a solid black region. Furthermore, FIG. 8 exemplarily shows a case where a charging plan to charge the power storage portion 15 in each of the periods of time of 1:00 to 2:00, 2:00 to 3:00, 3:00 to 4:00, 4:00 to 5:00, and 5:00 to 6:00 and a discharging plan to discharge the power storage portion 15 in each of the periods of time of 13:00 to 14:00, 14:00 to 15:00, 15:00 to 16:00, 16:00 to 17:00, and 17:00 to 18:00 are formulated.

As shown in FIG. 8, in each of the periods of time in which the power storage portion 15 is charged (1:00 to 6:00, which are periods of time in which the emission amount of carbon dioxide emitted by a power company is low), not only an amount of system power that should be purchased as calculated by the required power amount calculation portion 20 (the slant-hatched region in FIGS. 3 and 8) but also an amount of power to be charged in the power storage portion 15 (the lattice-hatched region in FIG. 8) is further required, so that an amount of system power purchased (a region obtained by combining the slant-hatched region with the lattice-hatched region in FIG. 8) is increased.

Meanwhile, in each of the periods of time in which the power storage portion 15 is discharged (13:00 to 18:00, which are periods of time in which the emission amount of carbon dioxide emitted by the power company is high), an amount of system power that should be purchased (the slant-hatched region in FIG. 3) can be reduced by using an amount of power supplied by the power storage portion 15 (the solid black region in FIG. 8). Thus, in each of said periods of time, the amount of system power purchased (the slant-hatched region in FIG. 8) can be reduced.

According to the above-described configuration, the power supply system 1 operates based on the emission amount of carbon dioxide emitted by a power company. Thus, the emission amount of carbon dioxide emitted by a power company can be reduced easily. Compared with the emission amount of carbon dioxide emitted by households, stores, and so on, the emission amount of carbon dioxide emitted by a power company accounts for an extremely large proportion of a total emission amount thereof. Thus, reducing the emission amount of carbon dioxide emitted by a power company enables an effective reduction in the total emission amount of carbon dioxide.

Furthermore, even when power supplied from the power supply system 1 is consumed by the load portion R as intended by a user, by controlling charging and discharging of the power storage portion 15, it is possible to reduce the emission amount of carbon dioxide while securing the supply of a user's desired amount of power. This makes it possible to reduce the emission amount of carbon dioxide while allowing a user to lead a usual life.

Furthermore, the power storage portion 15 is charged preferentially in a period of time in which the emission amount of carbon dioxide emitted by a power company is low and is discharged preferentially in a period of time in which the emission amount of carbon dioxide emitted by a power company is high, and thus the emission amount of carbon dioxide emitted by a power company can be reduced efficiently.

Furthermore, an amount of power that is to be generated by the solar photovoltaic portion 11 and an amount of power that is to be consumed by the load portion R are predicted, and based on the amounts of power thus predicted, discharging of the power storage portion 15 is controlled. This allows power charged in the power storage portion 15 to be consumed by the load portion R automatically without being wasted.

Furthermore, the operation of the power storage portion 15 can be controlled by formulating a charging and discharging plan with respect to the power storage portion 15, for example, once a day. Thus, using a simple configuration and simple processing, control of charging and discharging of the power storage portion 15 can be achieved.

Although in FIGS. 6 and 7, STEP 704 where it is checked whether or not further charging can be performed and STEP 804 where it is checked whether or not further discharging can be performed are separate steps, these steps may be performed in combination. For example, at STEP 704, if discharging is set to be performed in a period of time earlier than the period of time indicated by the variable i, whether or not further charging can be performed may be judged in consideration of an amount of power that is to be lost, as a result of said discharging, from the amount of power charged in the power storage portion 15. Furthermore, at STEP 804, if charging is set to be performed in a period of time earlier than the period of time indicated by the variable j, whether or not further discharging can be performed may be judged in consideration of an amount of power that is to be added, as a result of said charging, to the amount of power charged in the power storage portion 15. This configuration allows the power storage portion 15 to be charged and discharged to an increased level.

Furthermore, in the method for formulating a discharging plan shown in FIG. 7, a maximum number of times of discharging M corresponding to the maximum number of times of charging N used in the charging plan shown in FIG. 6 may be set. In this case, an operation of checking whether or not the maximum number of times of discharging M has been attained, which is similar to the operation at STEP 705 in FIG. 6, may be performed after NO at STEP 802 or YES at STEP 804 and before STEP 805 in FIG. 8.

Furthermore, the operations at STEP 3 to STEP 8 shown in FIG. 2 may be performed in a different order, or some of them may be performed in parallel. It is premised, however, that STEPS 3 and 4 are performed prior to STEP 5, and STEP 3 to STEP 6 are performed prior to STEP 7 and STEP 8.

Furthermore, while in the foregoing discussion, system power purchased from a power company is charged in the power storage portion 15, and data on the emission amount of carbon dioxide emitted by a power company is recorded in the carbon dioxide emission amount database 18, the present invention may be applied to a power source other than a power company (for example, a power generator or the like). It is premised, however, that said power source emits carbon dioxide when performing power generation.

<Modified Example>

In the power supply system 1 according to the embodiment of the present invention, part or all of the respective operations of the weather prediction portion 13, the power generation prediction portion 14, the load prediction portion 17, the carbon dioxide emission amount analysis portion 19, the required power amount calculation portion 20, the charging and discharging plan formulation portion 21, the power storage portion control portion 22, and so on may be performed by a control device such as a microcomputer or the like. Moreover, a configuration may be adopted in which all or part of functions achieved by such a control device are described as a program, and said program is executed on a program execution device (for example, a computer) so that the all or part of functions are achieved.

Furthermore, not only in the above-described case but in other cases as well, the power supply system 1 shown in FIG. 1 can be realized by hardware or a combination of hardware and software. Furthermore, in a case where the power supply system is made up partly of software, it is assumed that a block in a section realized by the software represents a functional block in that section.

Furthermore, while the foregoing embodiment refers to the emission amount of carbon dioxide, the present invention is applicable also to other types of environmental load substances such as $NO_x$, $SO_x$, and the like.

While the foregoing has discussed the embodiment according to the present invention, the scope of the present invention is not limited thereto and may be embodied in variously modified forms without departing from the spirit of the invention.

INDUSTRIAL APPLICABILITY

The present invention is applicable to, for example, a power supply system that supplies power.

LIST OF REFERENCE SYMBOLS 1 power supply system
11 solar photovoltaic portion
12 power generation history recording portion
13 weather prediction portion
14 power generation prediction portion
15 power storage portion
16 load history recording portion
17 load prediction portion
18 carbon dioxide emission amount database
19 carbon dioxide emission amount analysis portion
20 required power amount calculation portion
21 charging and discharging plan formulation portion
22 power storage portion control portion
R load portion

The invention claimed is:

1. A power supply device, comprising:
a storage that stores emission amount data on an emission amount of an environmental load substance emitted by a predetermined power source when the power source performs power generation;
a storage battery in which power is charged and from which power is discharged;
an analysis circuit that, based on the emission amount data, sorts periods of time in ascending order of the emission amount of the environmental load substance or in descending order of the emission amount of the environmental load substance; and
a charging and discharging controller that, based on a result of sorting by the analysis circuit, assigns to each of the periods of time a level of priority in accordance with which charging is performed such that the lower the emission amount of the environmental load substance is, the higher the level of priority is and charges the storage battery with power supplied from the predetermined power source in accordance with the level of priority, while it assigns to each of the periods of time a level of priority in accordance with which discharging is performed such that the higher the emission amount of the environmental load substance is, the higher the level of priority is and discharges the storage battery in accordance with the level of priority, wherein:
the power supplied from the power source and the power supplied by discharge of the storage battery is supplied to the load, and
when data on an emission amount of the environmental load substance emitted by the power source is acquired, data is acquired that is based on data of the emission amount of the environmental load substance of a day weather of which is similar to weather as a result of weather prediction.

2. The power supply device according to claim 1, wherein if a period of time is designated, in which, as a result of charging the storage battery, a state of charge of the storage battery reaches a predetermined value, the charging and discharging controller prevents the storage battery from being charged, at least in said period of time, with power supplied from the predetermined power source.

3. The power supply device according to claim 2, wherein if a period of time is designated, in which a number of times of the charging exceeds a predetermined number of times, the charging and discharging controller prevents the storage battery from being charged at least in said period of time.

4. The power supply device according to claim 2, wherein if a period of time is designated, in which as a result of discharging the storage battery, a state of charge of the storage battery falls below a predetermined value, the charging and discharging controller prevents the storage battery from being discharged at least in said period of time.

5. The power supply device according to claim 2, wherein an emission amount of the environmental load substance refers to an emission amount of carbon dioxide.

6. The power supply device according to claim 2, further comprising:
a load prediction circuit that predicts an amount of power that is to be consumed by a load that consumes power supplied thereto,
wherein the power supply device can supply the load with power supplied from the power source and with power supplied by discharging the storage battery, and
based on the amount of power predicted by the load prediction circuit, the charging and discharging controller controls discharging of the storage battery.

7. The power supply device according to claim 2, wherein when data on an emission amount of the environmental load substance emitted by the power source is acquired, data corresponding to predicted weather is acquired.

8. The power supply device according to claim 1, wherein if a period of time is designated, in which a number of times of the charging exceeds a predetermined number of times, the charging and discharging controller prevents the storage battery from being charged at least in said period of time.

9. The power supply device according to claim 8, wherein if a period of time is designated, in which as a result of discharging the storage battery, a state of charge of the storage battery falls below a predetermined value, the charging and discharging controller prevents the storage battery from being discharged at least in said period of time.

10. The power supply device according to claim 8, wherein an emission amount of the environmental load substance refers to an emission amount of carbon dioxide.

11. The power supply device according to claim 8, further comprising:
a load prediction circuit that predicts an amount of power that is to be consumed by a load that consumes power supplied thereto, wherein the power supply device can supply the load with power supplied from the power source and with power supplied by discharging the storage battery, and based on the amount of power predicted by the load prediction circuit, the charging and discharging controller controls discharging of the storage battery.

12. The power supply device according to claim 8, wherein when data on an emission amount of the environmental load substance emitted by the power source is acquired, data corresponding to predicted weather is acquired.

13. The power supply device according to claim 1, wherein if a period of time is designated, in which as a result of discharging the storage battery, a state of charge of the storage battery falls below a predetermined value, the charging and discharging controller prevents the storage battery from being discharged at least in said period of time.

14. The power supply device according to claim 13, wherein an emission amount of the environmental load substance refers to an emission amount of carbon dioxide.

15. The power supply device according to claim 13, further comprising:
a load prediction circuit that predicts an amount of power that is to be consumed by a load that consumes power supplied thereto,
wherein the power supply device can supply the load with power supplied from the power source and with power supplied by discharging the storage battery, and
based on the amount of power predicted by the load prediction circuit, the charging and discharging controller controls discharging of the storage battery.

16. The power supply device according to claim 13, wherein when data on an emission amount of the environmental load substance emitted by the power source is acquired, data corresponding to predicted weather is acquired.

17. The power supply device according to claim 1, wherein an emission amount of the environmental load substance refers to an emission amount of carbon dioxide.

18. The power supply device according to claim 17, further comprising:
a load prediction circuit that predicts an amount of power that is to be consumed by a load that consumes power supplied thereto,
wherein the power supply device can supply the load with power supplied from the power source and with power supplied by discharging the storage battery, and
based on the amount of power predicted by the load prediction circuit, the charging and discharging controller controls discharging of the storage battery.

19. The power supply device according to claim 17, wherein when data on an emission amount of the environmental load substance emitted by the power source is acquired, data corresponding to predicted weather is acquired.

20. The power supply device according to claim 1, further comprising:
a load prediction circuit that predicts an amount of power that is to be consumed by a load that consumes power supplied thereto,
wherein the power supply device can supply the load with power supplied from the power source and with power supplied by discharging the storage battery, and
based on the amount of power predicted by the load prediction circuit, the charging and discharging controller controls discharging of the storage battery.

21. The power supply device according to claim 20, further comprising:
a power generation prediction circuit that predicts an amount of power that is to be supplied from a different power source than the power source,
wherein the power supply device can supply the load with power supplied from the different power source, and
the charging and discharging controller discharges the storage battery when an amount of power predicted by the load prediction circuit is larger than the amount of power predicted by the power generation prediction circuit.

22. The power supply device according to claim 21, wherein when data on an emission amount of the environmental load substance emitted by the power source is acquired, data corresponding to predicted weather is acquired.

23. The power supply device according to claim 20, wherein when data on an emission amount of the environmental load substance emitted by the power source is acquired, data corresponding to predicted weather is acquired.

* * * * *